United States Patent Office 3,365,446
Patented Jan. 23, 1968

3,365,446
3-SUBSTITUTED METHYLENE AND HALO-METHYLENE PREGNANES
Alexander D. Cross, Mexico City, Mexico, and Colin C. Beard, Boulder, Colo., assignors to Syntex Corporation, Panama, Panama, a corporation of Panama
No Drawing. Continuation-in-part of application Ser. No. 530,326, Feb. 28, 1966. This application Feb. 15, 1967, Ser. No. 616,209
20 Claims. (Cl. 260—239.55)

ABSTRACT OF THE DISCLOSURE $3\beta$-hydroxy-, -tetrahydropyran-2-yloxy-, and -acyloxy-pregnanes of the progestational and corticoid series having a cyclopropyl or halocyclopropyl group fused to at least one of positions C-1,2 and C-6,7, which are useful for their anabolic, progestational, and corticoid activity. 3 - keto-1,2-methylene-6,7-difluoromethylenepregnane intermediates and anabolic and progestational agents.

---

This is a continuation-in-part of Ser. No. 530,326, filed Feb. 28, 1966, now abandoned.

This invention relates to novel cyclopentanophenanthrene derivatives and to their preparation.

This invention is especially directed at novel $3\beta$-tetrahydropyranyl ethers of the pregnane series of steroids and the corresponding 19-nor derivatives thereof having at least one cyclopropyl (methylene) or halocyclopropyl (halomethylene) group fused to carbons 1 and 2 or carbons 6 and 7. These steroids are represented by the formula:

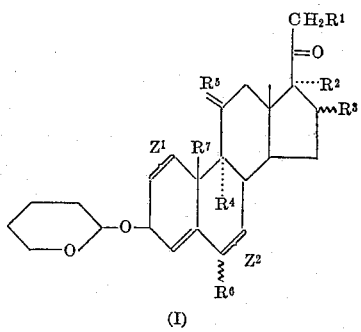

(I)

wherein $R^1$ is hydrogen, hydroxy, tetrahydropyran-2-yloxy, or a hydrocarbon carboxylic acid acyloxy group;
$R^2$ is hydrogen, hydroxy, or a hydrocarbon carboxylic acid acyloxy group;
$R^3$ is hydrogen, hydroxy, methyl, or when taken together with $R^2$, the group

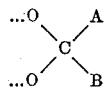

in which A is hydrogen or alkyl of up to 8 carbon atoms and B is hydrogen or alkyl or acyl of up to 8 carbon atoms;
$R^4$ is hydrogen, chloro, or fluoro;
$R^5$ is an oxygen atom or the group

in which $R^8$ is hydrogen, hydroxy, or chloro, $R^4$ and $R^8$ being the same when $R^8$ is chloro;
$R^6$ is hydrogen, methyl, chloro, or fluoro;
$R^7$ is hydrogen or methyl;

$Z^1$ is a carbon-carbon single bond or a methylene group of the formula

in which each of X and Y is hydrogen, chloro, or fluoro; and
$Z^2$ is a carbon-carbon single bond, a carbon-carbon double bond, or a methylene group of the formula

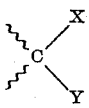

in which each of X and Y is hydrogen, chloro, or fluoro, at least one of $Z^1$ and $Z^2$ being said methylene group. In the above definitions, the wavy line ($\xi$) designates and includes both $\alpha$ and $\beta$ configurations.

Also included by the scope of the present invention are the novel $3\beta$-hydroxy and $3\beta$-acyloxy derivatives of the above compounds represented by and otherwise corresponding to Formula I. Particularly preferred are those of the following Formula Ia:

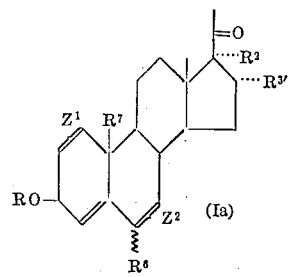

wherein R is hydrogen or a hydrocarbon carboxylic acid acyl group, $R^{3'}$ is hydrogen or methyl, and each of $R^2$, $R^6$, $R^7$, $Z^1$, and $Z^2$ is as hereinbefore defined.

The hydrocarbon carboxylic acyl and acyloxy groups of the present invention will contain less than 12 carbon atoms and may be of straight, branched, cyclic or cyclic-aliphatic chain structure. These may be saturated, unsaturated or aromatic and optionally substituted by functional groups, such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, $\beta$-chloropropionate, adamantoate, and the like.

The compounds of this invention demonstrate corticoid and progestational activities. In addition, they possess a high degree of oral activity which makes their administration simpler and more easily controlled, resulting in increased application in pharmaceutical compositions. This preferred manner of administration also provides the use of a convenient daily dosage regimen which can be adjusted according to the degree of affliction and response to treatment. Most conditions respond well to treatment in the order of magnitude usually employed in the case of other compounds so used; that is, via a daily dosage unit of from 0.001 mg. to 10 mg. per kg. of body weight, the remainder being an inert vehicle or combination thereof. The normally employed pharmaceutically acceptable non-toxic compositions are employed in the usual forms.

In particular, those compounds represented by Formula I above in which at least one of $R^1$ and $R^8$ is other than hydrogen exhibit corticoid activities thus making them useful as anti-inflammatory agents. A preferred and especially useful class of these compounds is represented by Formula II:

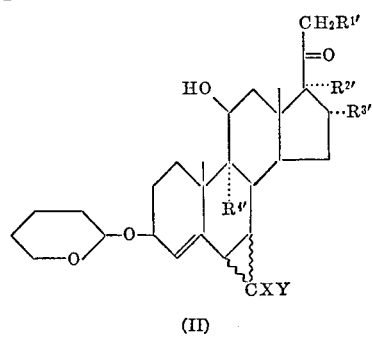

(II)

wherein each of X and Y is as hereinbefore defined, R¹′ is hydroxy or hydrocarbon carboxylic acid acyloxy, R²′ is hydrogen or hydroxy, R³′ is methyl or when taken together with R²′, isopropylidenedioxy, and R⁴′ is hydrogen or fluoro.

Those compounds of Formula I above in which each of R¹, R⁴, and R⁸ is hydrogen are progestational agents and are useful in the control and regulation of fertility and in the management of various menstrual disorders. These compounds also are anabolic agents and have varying degrees of anti-androgenic, anti-estrogenic, and anti-gonadotrophic activities. A preferred class of these compounds is represented by Formula III:

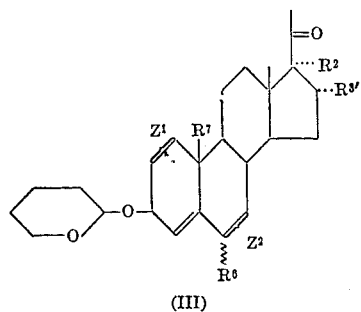

(III)

wherein R³′ is hydrogen or methyl and each of R², R⁶, R⁷, Z¹, and Z² is as hereinbefore defined. Of these compounds, those which contain the 1,2-methylene group (Z¹), the 6,7-difluoromethylene group (Z²), or both the 1,2-methylene and 6,7-difluoromethylene groups are particularly useful.

The novel steroidal ethers of this invention illustrated above are prepared in accordance herewith from the corresponding 3-keto precursor steroids by reduction of the 3-keto group, such as with lithium aluminum hydride, sodium borohydride, and the like in organic solution followed by etherification of the resultant allylic hydroxyl group with dihydropyran. This etherification reaction is optionally conducted in the presence of an inert organic solvent, such as benzene, diethyl ether, and the like, and in the presence of a catalytic amount of any stable sulfonyl chloride, preferably, p-toluenesulfonyl chloride, benzenesulfonyl chloride, methanesulfonyl chloride, p-nitrobenzenesulfonyl chloride, and the like.

The 3β-acylates hereof are prepared in accordance herewith upon treatment of the 3β-alcohol (obtained via selective reduction of the keto group) with the appropriate acylating agent conveniently under mild conditions. Useful acylating agents include the corresponding acid anhydrides, such as acetic anhydride and propionic anhydride, Alternatively, the corresponding acylchloride, such as benzoyl chloride, can be employed. The reaction is usually conducted at from room temperature to about reflux temperature, generally in the presence of pyridine as solvent. Typical acyloxy groups thus introduced in accordance herewith are the hydrocarbon carboxylic acid acyloxy groups listed and defined hereinbefore.

The 3-keto precursor steroids for the above elaboration are prepared by processes described in United States patent application Ser. No. 486,226, filed Sept. 9, 1965, and Ser. No. 499,092, filed Oct. 20, 1965. One particularly useful and novel class of precursors are the 1,2-methylene-6,7-difluoromethylene-17α-acryloxypregn-4-en-3-ones and the corresponding 17α-hydroxy and 17α-deshydroxy derivatives thereof, the preparation of which is described in detail hereinafter. These latter compounds, in addition to their usefulness as intermediates hereof, also exhibit anabolic and progestational activities.

The methyleneation reaction hereof by which a halomethylene group is added in at least one of positions C-1,2 and C-6,7 involves treatment of a conjugated unsaturated steroid with a molar excess of an alkali or alkaline earth metal salt of a haloacetic acid, such as bromochloroacetic acid, dichloroacetic acid, trichloroacetic acid, chlorofluoroacetic acid, difluorochloroacetic acid.

It is preferable to conduct this reaction after certain labile substituents, such as hydroxy groups, have been protected. This protection is preferably accomplished by converting them to esters, tetrahydropyranyl ethers, or ketones which groups readily facilitate the regeneration of the hydroxyl. This preference is not an absolute necessity, however, for while free hydroxy groups will often become involved in side reactions under the conditions of the process, they can be readily regenerated by execution of a mild hydrolysis after completion of the reaction. Compounds possessing the 17α,21-dihydroxy-20-keto system may be protected through formation of the 17α,20; 20,21-bismethylenedioxy derivative, such as by treatment with formaldehyde in the presence of acid.

The fused methylene group is introduced by reaction of the unsaturated steroid with dimethylsulfoxonium methylide base in dimethylsulfoxide. Alternatively, reductive dehalogenation of the halomethylene group, inserted via the methyleneation reaction described above, such as with lithium aluminum hydride affords the fused methylene group in lieu thereof.

The conjugated unsaturated starting steroid may be prepared in a number of ways. For example, in the introduction of a double bond between carbons 1 and 2, the A ring is first reduced with lithium metal in liquid ammonia providing the 3-keto-5α-pregnane(allopregnane). Upon treatment of the allopregnane thus obtained with bromine, sodium acetate, and p-toluenesulfonic acid, the 2-bromo-3-keto-5α-pregnane is obtained which is dehydrobrominated with calcium carbonate in dimethylacetamide to afford the Δ¹-unsaturated derivative. Thereafter, the corresponding 1,2-halomethylene derivative or, alternatively, the 1,2-methylene derivative is prepared as described hereinbefore. The introduction of a double bond between carbons 4 and 5 follows by a sequence of bromination followed by dehydrobromination as described above. The Δ⁴,⁶-diene system is provided by treating the 1,2-substituted-3-keto-4-ene with chloranil in the presence of ethyl acetate and acetic acid. Thus, for example, the 1,2-methylenepregn-4-en-3-ones and 1,2-methylenepregna-4,6-dien-3-ones of this invention are prepared as well as the 1,2-halomethylene derivatives thereof.

To provide a 6,7-halomethylene or -methylene substituent, a 3-keto-4,6-diene system is first generated, such as by treating the corresponding 3-keto-4-ene with chloranil in the presence of ethyl acetate and acetic acid as described above followed by introduction of the C-6,7 substituent as described above thus giving the 3-keto-4-ene containing a 6,7-halomethylene or -methylene group, i.e., the 6,7-halomethylenepregn-4-en-3-ones and 6,7-methylenepregn-4-en-3-ones.

The halomethylene or methylene group may similarly be inserted at position C-6,7 in a 1,2-substituted-3-keto-4,6-diene which is provided via the procedure outlined above. Thus obtained are the 1,2;6,7-bis(halomethylene)-pregn-4-en-3-ones and the corresponding methylene derivatives thereof.

The addition of the methylene and halomethylene groups in accordance with the procedures set forth herein at either of positions C–1,2 and C–6,7 is accomplished with the orientation of the resultant fused grouping including both isomeric alpha and beta configurations in variable ratios. The isomeric product mixture in each instance is conveniently and readily subjected to conventional techniques, such as chromatography, fractioned crystallization, and the like, by which the alpha and beta isomers are separated by virtue of their different physical properties. Each isomer can thereafter be subjected to further elaboration at other parts of the molecule.

In some instances, one particular configurational isomer predominates in the reaction mixture. Thus, for example, C–1,2 additions of either the methylene or halomethylene group usually favor the alpha isomer. The presence of an 11β-hydroxyl orients the C–6,7 methylene predominantly to the beta configuration, but does not alter the usual alpha to beta ratio in the halomethylene series. Beta addition in the halomethylene series is favored by the presence of a 9α-halo substituent.

The substituents represented by $R^6$ and $R^7$ are preferably present in the starting steroids although the 6-halo groups may be introduced by converting the 3-keto-4-ene to its enol ether, such as by treatment with ethylorthoformate and treating the thus prepared enol ether intermediate with N-chlorosuccinimide or perchloryl fluoride, respectively, yielding a 3-keto-4,6-diene containing a 6-chloro or 6-fluoro group.

The enol ether may also be treated with N-bromosuccinimide and the resultant 6-bromo compound then dehydrobrominated with calcium oxide to yield the 3-keto-4,6-diene. This upon treatment with chromyl chloride yields the 6,7-chlorohydrin which, when subjected to the action of hydrogen bromide in acetic acid, affords the 3-keto-6-chloro-4,6-diene.

The substituents represented and defined by $R^4$ and $R^5$ may be present in the starting steroid or they may be subsequently introduced via conventional procedures. Thus, a 11β-hydroxy compound is dehydrated to yield the 9(11)-ene. This compound is converted to the 9β,11β-oxido through the bromohydrin intermediate. Treatment of the oxido compound with hydrogen fluoride or hydrogen chloride then yields the 9α-fluoro-11β-hydroxy or 9α-chloro-11β-hydroxy compounds. Alternatively, the 9(11)-ene is treated with chlorine to yield the 9α,11β-dichloro derivative.

The substituents represented by $R^2$ and $R^3$ are present in the starting steroid. 16α,17α-acetals and ketals are prepared through treatment of a 16α,17α-dihydroxy compound with an aldehyde or ketone in the presence of an acid, such as perchloric acid. The resultant acetal or ketal, for example, a 16α,17α-isopropylidenedioxy derivative, may be utilized as a final compound or as an intermediate, the group being cleaved with regeneration of the diol by the action of hydrofluoric acid.

The 17α,20;20,21-bismethylenedioxy protecting group which is provided via treatment with formaldehyde in the presence of hydrochloric acid is removed by hydrolysis, such as with hydrofluoric acid to restore the dihydroxy keto side chain. The latter is then converted into the corresponding 21-tosylate or 21-mesylate by treatment with p-toluenesulfonyl chloride or methanesulfonyl chloride. The tosylate or mesylate group is replaced by iodine upon treatment with sodium iodide in mixture with acetone and the resulting 21-iodo compound is deiodinated by treatment with sodium bisulfite in mixture with aqueous methanol or by reaction with chromous chloride thus affording steroids containing the 17α-hydroxy-20-keto-20-methyl system.

The 17α- and 21-hydroxyl groups may be etherified with dihydropyran in the presence of p-toluenesulfonic acid or appropriately esterified with an acylating agent, such as acetic anhydride in acetic acid in the presence of p-toluenesulfonic acid and the like.

This invention may be better understood by reference to the following examples which illustrate but not limit the manner by which it can be practiced.

EXAMPLE 1

Part A

A solution of 200 mg. of 1α,2α-methylene-17α-acetoxypregn-4-ene-3,20-dione in 32 ml. of anhydrous isopropanol and 25 mg. of sodium borohydride is stirred at room temperature for 15 hours. One-hundred milliliters of water are added and the resulting suspension extracted several times with ether. The ether phase is dried over sodium sulfate and evaporated to dryness under reduced pressure to yield 1α,2α-methylene-17α-acetoxypregn-4-en-3β-ol-20-one which may be further purified by recrystallization from ether.

Two milliliters of dihydropyran are added to a solution of 1 g. of 1α,2α-methylene-17α-acetoxypregn-4-en-3β-ol-20-one in 15 ml. of benzene. About 1 ml. is removed by distillation to remove moisture and 0.4 g. of p-toluenesulfonyl chloride is added to the cooled solution. This mixture is allowed to stand at room temperature for four days and is then washed with aqueous sodium carbonate solution and water, dried and evaporated. The residue is chromatographed on neutral alumina, eluting with hexane to yield 1α,2α-methylene-3β-tetrahydropyran-2'-yloxy-17α-acetoxypregn-4-en-20-one which is recrystallized from pentane.

Similarly, 1β,2β - methylene - 3β - tetrahydropyran - 2'-yloxy-17α-acetoxypregn-4-en-20-one is prepared from 1β,2β-methylene-17α-acetoxypregn-4-ene-3,20-dione.

In like manner, the corresponding 17α-hydroxy and 17α-deshydroxy compounds are prepared, the hydroxy by final hydrolysis.

A mixture of 1 g. of 1α,2α-methylene-17α-acetoxypregn-4-en-3β-ol-20-one, 4 ml. of pyridine, and 2 ml. of acetic anhydride is allowed to stand at room temperature for 15 hours. The mixture is then poured into ice water and the solid which forms is collected by filtration, washed with water, and dried to yield 1α,2α-methylene-3β,17α-diacetoxypregn-4-en-20-one which may be further purified through recrystallization from acetone:hexane.

A mixture of 2 g. of 1α,2α-methylene-17α-acetoxypregn-4-en-3β-ol-20-one in 8 ml. of pyridine and an equimolar amount of benzoyl chloride is heated at steam bath temperatures for thirty minutes. The mixture is then poured into ice water and the solid which forms is collected by filtration, washed with water, and dried to yield 1α,2α - methylene - 3β-benzoyloxy - 17α-acetoxypregn - 4-en-20-one which is further purified through recrystallization from methylene chloride:hexane.

Upon the substitution of the appropriate acylating agent in the above procedures, the corresponding 3β-propionate, -valerate, -caproate, -enanthate, and -adamantoate esters are prepared.

Part B

The requisite 1,2-methylene starting compounds for the procedures described under Part A above are prepared as follows.

To a solution of 1 g. of 17α-hydroxyprogesterone in 75 ml. of tetrahydrofuran and 125 ml. of liquid ammonia is added over a 20-minute period, 0.27 g. of lithium. The mixture is refluxed with stirring for 2.5 hours and its color then discharged by the careful addition of ethanol. The resulting solution is allowed to stand at room temperature until the ammonia has evaporated and the residue is next shaken with 100 ml. of 1:1 water:methylene chloride. The aqueous layer is separated and extracted with methylene chloride and the combined extracts and organic layer are dried over magnesium sulfate and evaporated. This residue is dissolved in 100 ml. of 5:9 methylene chloride:acetone and titrated with 8 N chromic acid, maintaining a temperature of 25° C. Thirteen milliliters of water are then added with gentle shaking and the aqueous phase is separated and extracted with methylene chloride. The combined extracts and organic layer are dried over magnesium sulfate and evaporated to dryness to yield a solid. A solution of 6 g. of the solid thus obtained in 120 ml. of pyridine is added to a mixture of 6 g. of chromic trioxide in 20 ml. of pyridine. The reaction mixture is allowed to stand at room temperature for 15 hours, diluted with ethyl acetate, and filtered through Celite diatomaceous earth. The filtrate is washed well with water, dried, and evaporated to dryness to yield 5α-pregnan-17α-ol-3,20-dione which may be further purified by recrystallization from acetone:hexane.

To a solution of 1 g. of 5α-pregnan-17α-ol-3,20-dione and 6.6 g. of p-toluenesulfonic acid in 330 ml. of glacial acetic acid is added, over a 10 minute period, a solution of 1.1 molar equivalent of bromine and 2.45 g. of sodium acetate in 110 ml. of glacial acetic acid. After stirring for an additional 10 minute period, a solution of 75 g. of sodium acetate in 150 ml. of glacial acetic acid is added and stirring is then continued at 20° C. for five minutes. The reaction mixture is next poured into one liter of ice water and the solid which forms is collected and dissolved in methylene chloride. This solution is washed with water, dilute sodium bicarbonate solution and water, dried, and evaporated to dryness. The residue is dissolved in 60 ml. of dimethylformamide and added to a well-stirred suspension of 12.5 g. of calcium carbonate in 440 ml. of dimethylacetamide and is heated at reflux. Refluxing is continued for 45 minutes and the mixture is then filtered and the filtrate is evaporated to dryness. This residue is chromatographed on acid washed alumina with 3:1 benzene:chloroform to yield 5α-pregn-1-en-17α-ol-3,20-dione which may be recrystallized from cyclohexane:ethyl acetate.

A mixture of 1 g. of 5α-pregn-1-en-17α-ol-3,20-dione, 25 ml. of dry benzene, 5 ml. of ethylene glycol, and 50 mg. of p-toluenesulfonic acid monohydrate is refluxed for 16 hours using a water separator. The reaction mixture is then washed with aqueous sodium bicarbonate solution and water, dried and evaporated to dryness to yield 20,20-ethylenedioxy-5α-pregn-1-en-17α-ol-3-one which is recrystallized from acetone:hexane.

A solution of 0.5 g. of 20,20-ethylenedioxy-5α-pregn-1-en-17α-ol-3-one in 5 ml. of dimethyl sulfoxide is added to a solution of one equivalent of dimethylsulfoxonium methylide in dimethylsulfoxide, prepared in the manner of Corey et al., J. Am. Chem. Soc. 87, 1353 (1965). The mixture is stirred under nitrogen and at room temperature for twenty hours and then at 50° C. for seven hours. Fifty milliliters of water are then added and the resulting mixture extracted four times with 50 ml. of ethyl acetate. The combined extracts are washed with water and saturated aqueous sodium chloride solution, dried over sodium sulfate, and evaporated to dryness. This residue is then chromatographed on silica, eluting with ether: methylene chloride to yield 1α,2α-methylene-20,20-ethylenedioxy-5α-pregnan-17α-ol-3-one and its corresponding 1β,2β-methylene isomer.

The 6,7-methylene derivatives are analogously prepared from the corresponding Δ⁴,⁶ starting compounds.

A mixture of 0.5 g. of 1α,2α-methylene-20,20-ethylenedioxy-5α-pregnan-17α-ol-3-one in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate, and evaporated to dryness. The residue is triturated with ether to yield 1α,2α-methylene-5α-pregnan-17α-ol-3,20-dione which is recrystallized from acetone:hexane.

To a stirred solution of 1 g. of 1α,2α-methylene-5α-pregnan-17α-ol-3,20-dione in 17 ml. of chloroform and 20 ml. of glacial acetic acid, cooled to −10° C., are added a few drops of a 15% solution of hydrogen bromide in acetic acid followed by a solution of 0.46 g. of bromine in 12 ml. of chloroform, the latter at such a rate that the reaction mixture maintains a pale yellow color. A cold solution of 2.5 g. of sodium acetate in 17 ml. of water is then added. The layers are separated and the aqueous layer is extracted with chloroform. The combined extracts and organic layer are washed with water, dilute potassium bicarbonate solution, and again with water, dried over sodium sulfate, and evaporated to dryness to yield the 4-bromo intermediate, 1 g. of which is dissolved in 20 ml. of dimethylformamide containing 0.5 g. of lithium chloride. This solution is stirred under nitrogen at steam bath temperatures for four hours. After cooling to 10° C., 11 ml. of water are added with stirring at such a rate that the temperature is maintained below 30° C. Stirring in an ice bath is continued until solid forms and this material is then collected by filtration, washed with cold 1:1 water: dimethylformamide and then water, and dried to yield 1α,2α - methylenepregn - 4-en-17α-ol-3,20-dione which is further purified through recrystallization from acetone with charcoal decolorization as necessary.

A mixture of 1 g. of 1α,2α-methylenepregn-4-en-17α-ol-3,20-dione, 1 g. of p-toluenesulfonic acid monohydrate, 50 ml. of acetate acid, and 25 ml. of acetic anhydride is allowed to stand at room temperature for 24 hours and then poured into water and stirred. This mixture is then extracted with methylene chloride and these extracts are dried and evaporated to yield 1α,2α-methylene-17α-acetoxy-pregn-4-ene-3,20-dione which is recrystallized from acetone:ether.

Analogously, 1β,2β-methylene-20,20-ethylenedioxy-5α-pregnan-17α-ol-3-one is treated as set forth in the preceding three paragraphs to afford 1β,2β-methylene-17α-acetoxypregn-4-ene-3,20-dione. Alternatively, the isomeric product mixture can be so treated and the resultant product mixture separated at reaction end into the respective isomers.

A double bond may be inserted between carbons 6 and 7 as follows.

A mixture of 1 g. of 1,2-methylene-17α-acetoxypregn-4-ene-3,20-dione, 2 g. of chloranil, 15 ml. of ethyl acetate, and 5 ml. of acetic acid is refluxed under nitrogen for 96 hours. The mixture is then cooled and washed with cold 10% aqueous sodium hydroxide until the washings are colorless. The organic solution is dried over sodium sulfate and the ethyl acetate removed by evaporation. Upon chromatography of the residue on neutral alumina there is obtained 1,2-methylene-17α-acetoxypregna-4,6-diene-3,20-dione which may be further purified by recrystallization from acetone:hexane.

The Δ⁴,⁶-diene may then be treated as described in Part A above to yield 1α,2α-methylene-3β-tetrahydroypran-2'-yloxy - 17α - acetoxypregna - 4,6-dien-20-one and 1β,2β-methylene - 3β - tetrahydropyran - 2' - yloxy - 17α-acetoxypregna-4,6-dien-20-one.

In a similar manner, the C–6,7 double bond can be introduced as described above into 1,2-methylenepregn-4-ene-3,20-dione, 1,2-methylene-6α-chloropregn-4-ene-3,20-dione, and 1,2 - methylene - 6α - chloro - 17α-acetoxypregn-4-ene-3,20-dione (respectively prepared according to the procedures illustrated in Part B above from progesterone, 6α-chloroprogesterone, and 6α-chloro-17α-hydroxyprogesterone with the acylation step omitted for the first two compounds) to give 1,2-methylenepregna-4,6-diene - 3,20 - dione, 1,2 - methylene-6-chloropregna-4,6-diene - 3,20 - dione, and 1,2 - methylene - 6 - chloro-17α-acetoxypregna - 4,6 - diene-3,20-dione, respectively. These compounds are reduced and etherified by the procedure of Part A above to respectively yield 1,2-methylene-3β-tetrahydropyran - 2' - yloxypregna - 4,6-dien-20-one, 1,2-methylene - 3β - tetrahydropyran - 2' - yloxy - 6-chloropregna - 4,6 - diene - 20 - one, and 1,2-methylene-3β-tetrahydropyran - 2' - yloxy - 6 - chloro - 17α-acetoxypregna-4,6-dien-20-one. Likewise, the other methylene pregnanes of this invention, including the 17α-deshydroxy and 16α-methyl derivatives, are prepared.

EXAMPLE 2

Part A

By following the reduction and etherification procedure outlined in Part A of Example 1, 3β-tetrahydropyran-2'-yloxy-6α,7α-difluoromethylene-17α - acetoxypregn-4-ene-20-one and 6β,7β - difluoromethylene-17α-acetoxypregn-4-en-20-one are prepared from 6α,7α-difluoromethylene-17α-acetoxypregn-4-ene - 3,20 - dione and 6β,7β-difluoromethylene-17α-acetoxypregn-4-ene-3,20-dione.

Base hydrolysis affords the free alcohols thusly:

A solution of 0.17 g. of potassium hydroxide in 0.2 ml. of water and 2.5 ml. of methanol is added over thirty minutes to a refluxing solution of 1 g. of 3β-tetrahydropyran-2'-yloxy-6,7-difluoromethylene-17α - acetoxypregn-4-ene-20-one in 30 ml. of methanol under nitrogen. The solution is refluxed for two hours, cooled, neutralized with acetic acid, and concentrated under reduced pressure. After the addition of water, the solid which forms is collected by filtration and dried to yield 3β-tetrahydropyran-2'-yloxy-6,7-difluoromethylenepregn-4-en-17α-ol - 20-one which is recrystallized from acetone:hexane.

The corresponding 3β-acylates are prepared upon treatment of the reduced 3β-alcohol according to the procedures set forth in the last three paragraphs of Part A of Example 1.

The above procedures are likewise useful in the 17α-deshydroxy series.

Part B

The requisite 6,7-difluoromethylene starting compounds for Part A hereof are provided as follows.

To a stirred and refluxing solution of 1 g. of 17α-acetoxypregna-4,6-diene-3,20-dione in 8 ml. of dimethyl diethyleneglycol ether is added in a dropwise fashion over a two hour period, a solution of thirty equivalents of sodium chlorodifluoroacetate in 30 ml. of dimethyl diethyleneglycol ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried, and chromatographed on alumina, eluting with methylene chloride to yield 6α,7α-difluoromethylene-17α-acetoxypregn-4-ene-3,20-dione and its corresponding 6β,7β-difluoromethylene isomer.

In a similar manner, 6-chloro-17α-acetoxypregn-4,6-diene-3,20 dione is treated as described in Part B above to give 6β - chloro-6,7-difluoromethylene - 17α - acetoxypregn-4-ene-3,20 dione which is reduced and etherified as described in Part A of this example to yield 3β-tetrahydropyran-2'-yloxy-6β-chloro-6,7-difluoromethylene - 17α-acetoxypregn-4-en-20-one.

By substituting sodium trichloroacetate in lieu of sodium chlorodifluoroacetate in practicing the foregoing procedure, there is obtained the corresponding dichloromethylene steroids. Likewise, the use of sodium chlorofluoroacetate and sodium dichloroacetate therein produces the monofluoro- and monochloromethylene derivatives, respectively.

The other 6,7-difluoromethylene pregnanes of this invention, including the 17α-deshydroxy derivatives, are also thus prepared, the isomers being separable by chromatography.

Analogously, the foregoing procedures are used to prepare the corresponding 1,2-difluoromethylene pregnanes of this invention.

EXAMPLE 3

Part A

1α,2α-methylene-6α,7α-difluoromethylene - 17α - acetoxypregn-4-ene-3,20-dione is reduced and etherified as outlined in Part A of Example 1 yielding 1α,2α-methylene-3β-tetrahydropyran-2'-yloxy - 6α,7α - difluoromethylene-17α-acetoxypregn-4-ene-20-one.

In a similar manner, the corresponding C–1,2 and C–6,7 beta isomers are so prepared.

The procedures set forth in the last three paragraphs of Part A of Example 1 prepare the corresponding 3β-acylates from the precursor 3β-alcohols.

The foregoing are likewise useful in the 17α-deshydroxy series.

Base hydrolysis according to the third paragraph of Part A of Example 2 gives the corresponding 17α-hydroxy compounds.

Part B

The requisite starting compounds above are provided by treating 1,2 - methylene-17α-acetoxypregna-4,6-diene-3,20-dione (prepared as described in Part B of Example 1) with sodium chlorodifluoroacetate as outlined in the second paragraph of Part B of Example 2 to yield 1,2-methylene-6,7-difluoromethylene - 17α - acetoxypregn-4-ene-3,20-dione.

In a similar manner as that described in this example earlier, 1,2-methylene - 3β - tetrahydropyran-2'-yloxy-6β-chloro-6,7-difluoromethylene - 17α - acetoxypregn-4-en-20-one is prepared from 1,2-methylene-6-chloro-17α-acetoxypregn-4,6-diene-3,20-dione. Similarly prepared are the other 1,2-methylene-6,7-difluoromethylene pregnanes of this invention, the isomers being separable, in each instance, via conventional procedures, such as preparative chromatography.

EXAMPLE 4

Part A

1α,2α methylene-21-acetoxypregn - 4 - ene-11β,17α-diol-3,20-dione is selectively reduced and then treated with dihydropyran as described in Part A of Example 1 to yield 1α,2α-methylene-3β-tetrahydropyran-2'-yloxy-21-acetoxypregn-4-ene-11β,17α-diol-20-one which may be treated with base to give the corresponding 21-ol as follows.

A suspension of 1 g. of 1α,2α-methylene-3β-tetrahydropyran-2'-yloxy-21-acetoxypregn-4-ene-11β,17α-diol-20-one in 60 ml. of methanol is treated with a solution of 1 g. of potassium carbonate in 6 ml. of water. The mixture is heated at 0° C. for one hour, cooled in ice, and diluted with water. The solid which forms is collected by filtration, washed with water, and dried to yield 1α,2α-methylene-3β-tetrahydropyran-2'-yloxypregn-4-ene-11β,17α,21-triol-20-one which is recrystallized from acetone:hexane.

In an analogous manner, the corresponding 1β,2β-methylene-3β-tetrahydropyran - 2' - yloxypregn-4-ene-11β,17α,21-triol-20-one is thus prepared.

The corresponding 3β-acylates are prepared according to the procedures given in the last three paragraphs of Example 1 (Part A).

The foregoing are likewise useful in the 17α-deshydroxy series.

Part B

The starting compounds for Part A, that is, the C–1,2 alpha and beta isomers of 1,2-methylene-21-acetoxypregn-4-ene-11β,17α-diol-3,20-dione, are prepared from pregn-4-ene-11β,17α,21-triol-3,20-dione as follows.

To a solution of 5 g. of pregn-4-ene-11β,17α,21-triol-3,20-dione in 200 ml. of chlorform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate, and evaporated to dryness to yield 17α,20;20,21-bismethylenedioxypregn-4-en-11β-ol-3-one which is recrystallized from methanol:ether.

The product thus formed is treated according to the procedures of Part B of Example 1 to consecutively form the corresponding 5α-allopregnane, Δ¹ derivative, and finally, 1,2 - methylene-17α,20;20,21 - bismethylenedioxypregn-4-en-11β-ol-3-one.

A suspension of 1 g. of 1,2-methylene-17α,20;20,21-bismethylenedioxypregn-4-en-11β-ol-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 1,2-methylenepregn-4-ene-11β,17α,21-triol-3,20-dione which may be further purified through recrystallization from isopropanol.

A mixture of 1 g. of 1,2-methylenepregn-4-ene-11β,17α,21-triol-3,20-dione, 4 ml. of pyridine, and 2 ml. of acetic anhydride is allowed to stand at room temperature for fifteen hours. The mixture is then poured into ice water, and dried to yield 1,2-methylene-21-acetoxypregn-4-ene-11β,17α-diol-3,20-dione which may be further purified through recrystallization from acetone:hexane.

By following the procedure outlined in Example 1, Part B, for inserting a double bond at C-6,7 on either of the compounds prepared immediately above, 1α,2α-methylene-21-acetoxypregna - 4,6-diene-11β,17α-diol-3,20-dione and 1β,2β-methylene-21-acetoxypregna-4,6 - diene-11β,17α-diol-3,20-dione are prepared which are similarly treated as in Part A hereof to give the corresponding 3β-tetrahydropyran-2'-yloxy-Δ$^{4,6}$-dienes.

In a similar manner, 9α,11β-dichloropregn-4-ene-17α,21-diol-3,20-dione is used as a starting steroid in Part B hereof except for the procedure set forth in the immediately preceding paragraph to afford 1,2-methylene-9α,11β-dichloro-21-acetoxypregn - 4 - en-17α-ol-3,20-dione which is treated as in Part A hereof thus giving 1α,2α-methylene-3β-tetrahydropyran-2'-yloxy - 9α,11β-dichloropregn-4-ene-17α,21-diol-20-one and the corresponding 1β,2β-methylene isomer thereof. 9α-11β-dichloropregn-4-ene-3,20-dione is similarly treated, including the C-6,7 double bond insertion procedure in Part B hereof, but omitting the bismethylenedioxy protecting group procedures to give 1,2-methylene-3β-tetrahydropyran-2'-yloxy-9α,11β-dichloropregna-4,6-dien-20-one. The other 1,2-methylene corticoids of this invention, such as the corresponding corticoids containing a 16α-methyl, 9α-fluoro, and combinations thereof, are similarly prepared, the isomers, in each instance, being separable by chromatography as set forth above.

In the 6,7-methylene series in conjunction with an 11β-hydroxy group, the beta isomer predominates.

EXAMPLE 5

Part A

Reduction and etherification of 6α,7α-difluoromethylene-21-acetoxypregn-4-en-11β,17α-diol-3,20-dione with subsequent basic hydrolysis as described in Part A of Example 4 affords 3β-tetrahydropyran-2'-yloxy-6α,7α-difluoromethylenepregn-4-ene-11β,17α,21-triol-20-one.

Similarly, 3β-tetrahydropyran-2'-yloxy-6β,7β - difluoromethylenepregn-4-ene-11β,17α,21 - triol - 20 - one is thus prepared from the corresponding C-6β,7β starting compound.

Treatment of the 3β,11β,17α,21-tetrol with dihydropyran affords the 3β,21-bistetrahydropyran-2'-yloxy ether thereof.

The procedures of the last three paragraphs of Part A of Example 1 prepare the corresponding 3β-acylates of the free alcohols after prior protection of the side chain.

The foregoing are likewise useful in the 17α-deshydroxy series.

Part B

The requisite starting steroids for the above procedure is prepared by inserting a double bond at C-6,7 in 17α, 20;20,21 - bismethylenedioxypregn - 4 - en - 11β-ol-3-one (prepared by the procedure provided in Example 4) following the procedure set forth therefor in Example 1, Part B, followed by treatment of the thus prepared 4,6-diene with sodium chlorodifluoroacetate as given in Ex- is prepared by inserting a double bond at C-6,7 in 17α, 20;20,21-bismethylenedioxypregn-4-en-11β-cl-3-one isomers separable by chromatography. Finally, the protecting group is removed and the 21-acetoxy group is provided by the procedures given in Part B, Example 4.

Likewise, by practicing the procedures outlined in Parts A and B of this example on 16α-methylpregn-4-ene-11β, 17α,21-triol-3,20-dione, 9α-fluoro-16α-methylpregn-4-ene-11β,17α,21-triol-3,20-dione, and 6α,16α-dimethylpregn-4-ene-11β,17α,21-triol-3,20-dione, there are ultimately respectively obtained 3β-tetrahydropyran-2'-yloxy-6,7-difluoromethylene-16α-methylpregn-4-ene-11β,17α,21 - triol-20-one; 3β-tetrahydropyran-2'-yloxy-6,7-difluoromethylene-9α-fluoro-16α-methylpregn - 4 - ene-11β,17α,21-triol-3,20-dione; and 3β-tetrahydropyran-2'-yloxy-6,7-difluoromethylene-6α,16α - dimethylpregn - 4 - ene - 11β,17α,21-triol-3,20-dione. Similarly, the other 6,7-difluoromethylene corticoids of this invention, including the 11β,17-diols and the 17α-dehydroxy compounds are prepared. By eliminating the hydrolysis step of Part A hereof, the corresponding 21-acetates are prepared. In the case of 9α-fluoro-16α - methylpregn-4-ene - 11β,17α,21 - triol-3,20-dione mentioned above, as well as the other 9α-fluoro compounds contemplated herein, the 6β,7β-difluoromethylene isomer is favored.

EXAMPLE 6

Part A

In the same manner as described in Part A of Example 1, 6α,7α-difluoromethylene-16α,17α-isopropylidenedioxy-21-acetoxypregn-4-en-11β-ol-3,20-dione is converted to 3β-tetrahydropyran-2' - yloxy-6α,7α - difluoromethylene-16α,17α-isopropylidenedioxy-21 - acetoxypregn-4-en-11β-ol-20-one. The 21-acetoxy group is thereafter removed with base as given in Example 4 (Part A) to give 3β-tetrahydropyran-2' - yloxy-6α,7α - difluoromethylene-16α,17α-isopropylidenedioxypregn-4-ene-11β,21-diol-20-one.

Likewise, the corresponding 6β,7β-difluoromethylene isomer is formed from the requisite C-6β,7β starting compound.

The corresponding 3β-acylates are prepared via the procedures of the last three paragraphs of Example 1 (Part A).

The foregoing are likewise useful in the 17α-deshydroxy series.

Part B

The requisite starting compounds for the procedure illustrated above is provided by procedures analogous to those described in Part B of Example 5 from 16α,17α-isopropylidenedioxypregn-4-ene - 11β,21 - diol-3,20-dione omitting the procedures for the introduction and removal of the bismethylenedioxy protecting group.

In a similar manner to that outlined above, 3β-tetrahydropyran-2'-yloxy - 6,7 - difluoromethylene-9α-fluoro-16α,17α-isopropylidenedioxypregn-4-ene-11β,21 - diol-20-one and 3β-tetrahydropyran-2'-yloxy-6,7-difluoromethylene-6β,9α-difluoro - 16α,17α - isopropylidenedioxypregn-4-ene-11β,21-diol-20 - one are prepared from the corresponding starting steroids, the C-6β,7β isomer predominating in each instance. By omitting the last procedure mentioned in Part A above, the corresponding 21-acetoxy compounds are provided.

By following the procedure outlined in Example 4 for inserting the 1,2-methylene and 3β-tetrahydropyran-2'-yloxy groups but omitting the step for the insertion and removal of the bismethylenedioxy protecting group on 6α-fluoro - 16α,17α - isopropylidenedioxypregn-4-ene-11β,21-diol-3,20-dione and 6α,9α-difluoro - 16α,17α-isopropylidenedioxypregn-4-ene-11β,21-diol-3,20-dione, there are respectively obtained, 1,2-methylene-3β-tetrahydropyran-2'-yloxy-6α-fluoro - 16α,17α-isopropylidenedioxypregn-4- ene-11β,21-diol-20-one and 1,2-methylene-3β-tetrahydropyran-2'-yloxy - 6α,9α - difluoro-16α,17α-isopropylidenedioxypregn-4-ene-11β,21-diol-20-one. Similarly, by eliminating the last step thereof, the corresponding 21-acetoxy derivatives are obtained.

EXAMPLE 7

Part A

By practicing the procedures set forth in Part A of Example 4 on 1,2-methylene-6,7-difluoromethylene-21-acetoxypregn-4-ene-11β,17α-diol-3,20-dione, there is obtained 1,2-methylene-3β-tetrahydropyran-2'-yloxy-6,7-difluoromethylenepregn-4-ene-11β,17α,21-triol-20-one.

The corresponding 3β-acylates are prepared via the procedures of the last three paragraphs of Example 1 (Part A).

The foregoing are likewise useful in the 17α-deshydroxy series.

Part B

The starting steroids for Part A hereof is provided according to the procedure of Part B of Example 3 from 1,2-methylene - 21 - acetoxypregna - 4,6 - diene-11β,17α-diol-3,20-dione which is, in turn, prepared in accordance with Part B of Example 4 from pregn-4-ene-11β,17α-21-triol-3,20-dione.

In a manner similar to this example is formed 1,2-methylene-3β - tetrahydropyran-2'-yloxy - 6α,9α - difluoro-6α,7α-difluoromethylene-16α - methylpregn-4-ene-11β-17α,21-triol-20-one from 6α,9α-difluoro-16α-methylpregn-4-ene-11β,17α,21-triol-3,20-dione. The other 1,2-methylene-6,7-difluoromethylene corticoids, including the 16α,17α-isopropylidenedioxy derivatives are also formed in accordance herewith.

EXAMPLE 8

Upon subjecting 17α,20;20,21 - bismethylenedioxypregna-4,6-dien-11β-ol-3-one (prepared as described in the first paragraph of Part B of Example 5) to the procedure set forth in Example 1 for the insertion of a methylene group, 6β,7β-methylene-17α,20;20,21-bismethylenedioxypregn-4-en-11β-ol-3-one together with some of the corresponding C–6α,7α-methylene isomer is prepared. Thereafter, hydrolysis of the side chain protecting group by the procedure given in Example 4 (Part B) and selective reduction and etherification at C–3 provides 3β-tetrahydropyran-2'-yloxy - 6β,7β - methylenepregn-4-ene-11β,17α,21-triol-20-one. The alpha isomer is similarly elaborated.

The corresponding 3β-acylates are prepared via the procedures of the last three paragraphs of Example 1 (Part A).

The foregoing are likewise useful in the 17α-deshydroxy series.

What is claimed is:

1. Steroids of the formula:

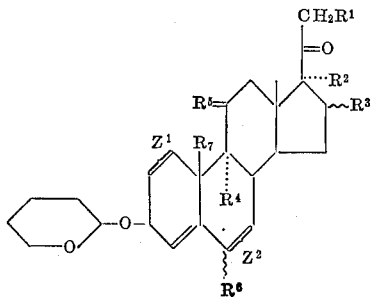

wherein
$R^1$ is hydrogen, hydroxy, tetrahydropyran-2-yloxy, or a hydrocarbon carboxylic acid acyloxy group of less than 12 carbon atoms;
$R^2$ is hydrogen, hydroxy, or a hydrocarbon carboxylic acid acyloxy group of less than 12 carbon atoms;
$R^3$ is hydrogen, hydroxy, methyl, or when together with $R^2$, the group

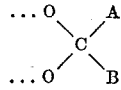

in which A is hydrogen or alkyl of up to 8 carbon atoms and B is hydrogen or alkyl or acyl of up to 8 carbon atoms;
$R^4$ is hydrogen, chloro, or fluoro;
$R^5$ is an oxygen atom or the group

in which $R^8$ is hydrogen, hydroxy, or chloro, $R^4$ and $R^8$ being the same when $R^8$ is chloro;
$R^6$ is hydrogen, methyl, chloro, or fluoro;
$R^7$ is hydrogen or methyl;
$Z^1$ is a carbon-carbon single bond or a methylene group of the formula

in which each of X and Y is hydrogen, chloro, or fluoro; and
$Z^2$ is a carbon-carbon single bond, a carbon-carbon double bond, or a methylene group of the formula

in which each of X and Y is hydrogen, chloro, or fluoro, at least one of $Z^1$ and $Z^2$ being said methylene group.

2. Steroids of claim 1 wherein $R^1$ is hydroxy or a hydrocarbon carboxylic acid acyloxy group of less than 12 carbon atoms;
$R^2$ is hydrogen or hydroxy;
$R^3$ is α-methyl or when taken together with $R^2$, the group

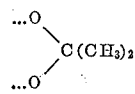

$R^4$ is hydrogen or fluoro;
$R^5$ is the group

in which $R^8$ is hydroxy;
$R^6$ is hydrogen;
$R^7$ is methyl;
$Z^1$ is a carbon-carbon single bond; and
$Z^2$ is the group

in which each of X and Y is hydrogen or fluoro.

3. Steroids of claim 2 wherein each of $R^1$ and $R^2$ is hydroxy and $R^3$ is α-methyl.

4. Steroids of claim 2 wherein $R^1$ is hydroxy, $R^2$ is hydrogen, and $R^3$ is α-methyl.

5. Steroids in claim 1 wherein $R^1$ is hydrogen;
$R^2$ is hydrogen, hydroxy, or a hydrocarbon carboxylic acid acyloxy group of less than 12 carbon atoms;
$R^3$ is hydrogen or α-methyl;
$R^4$ is hydrogen;
$R^5$ is the group

in which $R^8$ is hydrogen;
$R^6$ is hydrogen, chloro, fluoro, or methyl;
$R^7$ is hydrogen or methyl;

$Z^1$ is the group

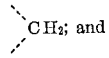
$CH_2$; and $Z^2$ is a carbon-carbon single bond or a carbon-carbon double bond.

6. Steroids of claim 5 wherein $R^3$ is hydrogen, $R^6$ is chloro, $R^7$ is methyl, and $Z^2$ is a carbon-carbon double bond.

7. A steroid of claim 5 wherein $R^2$ is hydrogen, $R^3$ is α-methyl, $R^6$ is chloro, $R^7$ is methyl, and $Z^2$ is a carbon-carbon single bond.

8. A steroid of claim 5 wherein $R^2$ is hydrogen, $R^3$ is α-methyl, each of $R^6$ and $R^7$ is methyl, and $Z^2$ is a carbon-carbon single bond.

9. Steroids of claim 1 wherein $R^1$ is hydrogen;
$R^2$ is hydrogen, hydroxy, or a hydrocarbon carboxylic acid acyloxy group of less than 12 carbon atoms;
$R^3$ is hydrogen or α-methyl;
$R^4$ is hydrogen;
$R^5$ is the group

in which $R^8$ is hydrogen;
$R^6$ is hydrogen, chloro, fluoro, or methyl;
$R^7$ is hydrogen or methyl;
$Z^1$ is a carbon-carbon single bond; and
$Z^2$ is the group

10. Steroids of claim 9 wherein each of $R^2$ and $R^6$ is hydrogen.

11. Steroids of claim 9 wherein $R^2$ is hydrogen and $R^6$ is chloro.

12. Steroids of claim 9 wherein $R^2$ is acetoxy and $R^6$ is hydrogen.

13. Steroids of claim 9 wherein $R^2$ is acetoxy and $R^6$ is chloro.

14. Steroids of the formula:

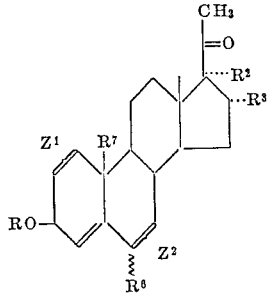

wherein R is hydrogen or a hydrocarbon carboxylic acid acyl group of less than 12 carbon atoms;
$R^2$ is hydrogen, hydroxy, or a hydrocarbon carboxylic acid acyloxy group of less than 12 carbon atoms;
$R^3$ is hydrogen or methyl;
$R^6$ is hydrogen, chloro, fluoro, or methyl;
$R^7$ is hydrogen or methyl;
$Z^1$ is a carbon-carbon single bond or a methylene group of the formula

$CH_2$; and $Z^2$ is a carbon-carbon single bond, a carbon-carbon double bond, or a methylene group of the formula

at least one of $Z^1$ and $Z^2$ being said methylene group.

15. Steroids of claim 14 wherein $Z^1$ is the group

16. Steroids of claim 14 wherein $Z^1$ is a carbon-carbon single bond and $Z^2$ is the group

17. A steroid of claim 16 wherein each of R, $R^2$, $R^3$, $R^6$, and $R^7$ is hydrogen.

18. Steroids of claim 16 wherein R is a hydrocarbon carboxylic acid acyl group of less than 12 carbon atoms, $R^2$ is hydrogen, $R^3$ is methyl, and $R^6$ is hydrogen.

19. Steroids of claim 16 wherein R is a hydrocarbon carboxylic acid acyl group of less than 12 carbon atoms, $R^2$ is hydrogen, $R^3$ is methyl, and $R^6$ is chloro.

20. Steroids of the formula:

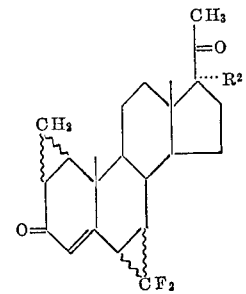

wherein $R^2$ is hydrogen, hydroxy, or a hydrocarbon carboxylic acid acyloxy group of less than 12 carbon atoms.

References Cited

UNITED STATES PATENTS

| | | | |
|---|---|---|---|
| 3,127,396 | 3/1964 | Waichert et al. | 260—239.5 |
| 3,243,434 | 3/1966 | Krakower | 260—239.55 |

LEWIS GOTTS, *Primary Examiner.*

H. FRENCH, *Assistant Examiner.*

UNITED STATES PATENT OFFICE
CERTIFICATE OF CORRECTION

Patent No. 3,365,446                                        January 23, 1968

Alexander D. Cross et al.

It is hereby certified that error appears in the above numbered patent requiring correction and that the said Letters Patent should read as corrected below.

Column 4, line 6, for "acryloxypregn" read -- acyloxypregn --; column 12, lines 3 to 4, for "Ex- is prepared by inserting a double bond at C-6,7 in" read -- Example 2, Part B, giving the 6,7-difluoromethylene- --; line 22, for "dehydroxy" read -- deshydroxy --; column 14, lines 20 to 24, the formula should appear as shown below instead of as in the patent:

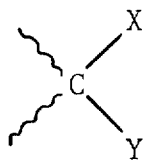

Signed and sealed this 25th day of March 1969.

(SEAL)
Attest:

EDWARD M. FLETCHER, JR.                          EDWARD J. BRENNER
Attesting Officer                                    Commissioner of Patents